No. 654,017. Patented July 17, 1900.
J. A. MILLS.
MEANS FOR AUTOMATICALLY INFLATING PNEUMATIC TIRES.
(Application filed May 12, 1900.)
(No Model.)
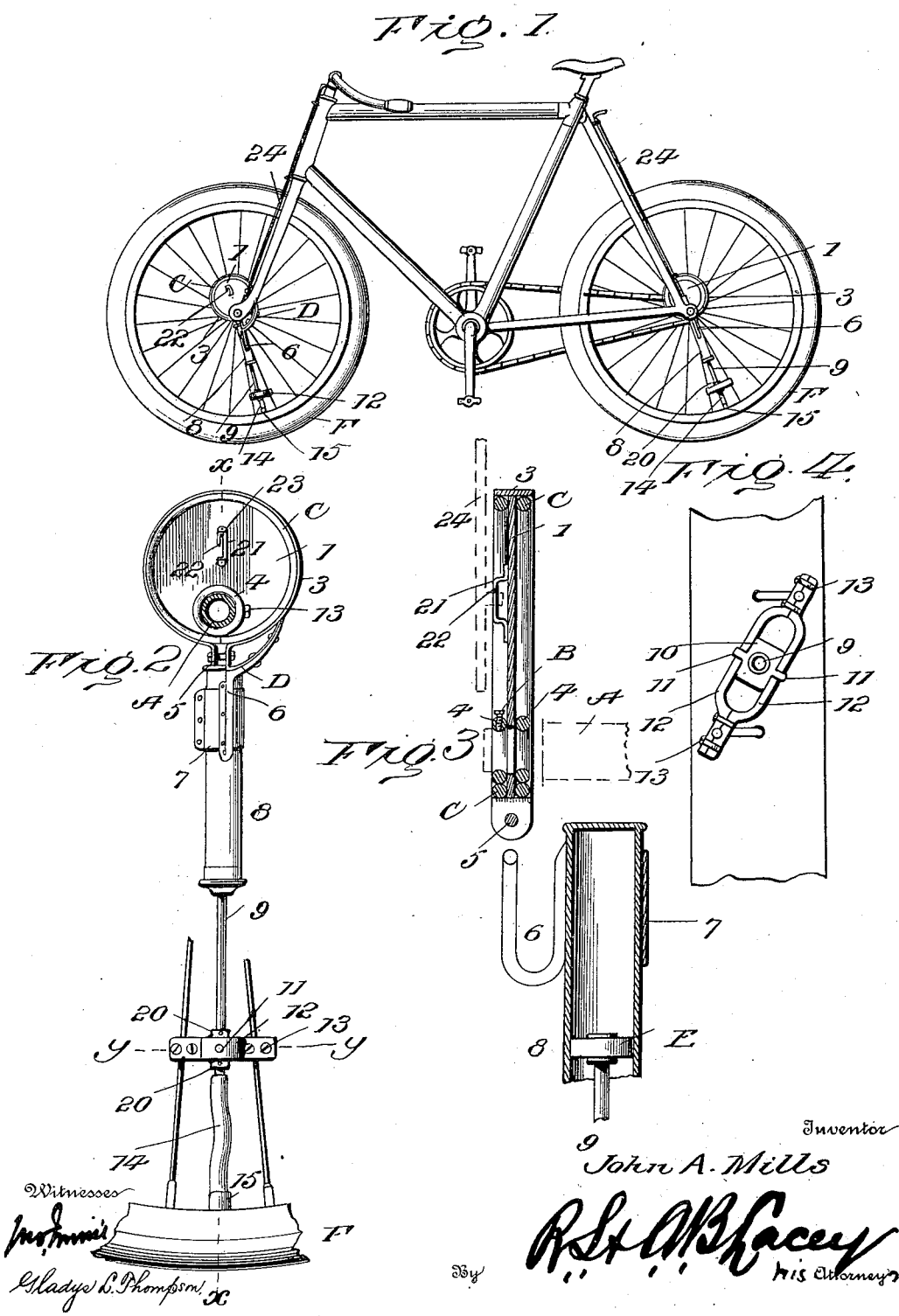

UNITED STATES PATENT OFFICE.

JOHN ANDREW MILLS, OF GAINESVILLE, TEXAS.

MEANS FOR AUTOMATICALLY INFLATING PNEUMATIC TIRES.

SPECIFICATION forming part of Letters Patent No. 654,017, dated July 17, 1900.

Application filed May 12, 1900. Serial No. 16,490. (No model.)

*To all whom it may concern:*

Be it it known that I, JOHN ANDREW MILLS, a citizen of the United States, residing at Gainesville, in the county of Cooke and State of Texas, have invented certain new and useful Improvements in Means for Automatically Inflating Pneumatic Tires; and I do hereby declare the following to be a full, clear, and exact description of the invention, such as will enable others skilled in the art to which it appertains to make and use the same.

It is not always convenient and desirable to stop a machine—as a bicycle, velocepede, automobile, and the like—or a buggy or other vehicle having its wheels fitted with pneumatic tires to inflate them should the air escape.

This invention provides novel means for pumping air into the tires and actuated from the wheel when the latter is in motion, the pumping mechanism being under control of the rider at all times, so as to be thrown into and out of action at will without requiring the stopping of the machine or vehicle. When the tire is sufficiently inflated and tight, the pump is thrown out of action, so as not to detract from the propulsive force. Should the tire leak by means of a puncture or from other cause, it can be maintained in working condition by throwing the pump into action, thereby enabling the person to reach the desired destination, where the necessary repair can be made.

It is to be understood that each wheel is to be similarly equipped and provided with means for throwing the pump into and out of action, as required, the setting means being within convenient reach of the rider or operator, so as to be accessible at all times without requiring dismounting or leaving the seat.

The invention consists of the novel features, details of construction, and combination of the parts, which hereinafter will be more fully disclosed and finally claimed, and for this purpose, and also to acquire a knowledge of the merits of the invention and the structural details of the means whereby the results are attained, reference is to be had to the appended description and the drawings hereto attached.

While the essential and characteristic features of the invention are necessarily susceptible of modification, still the preferred embodiment of the invention is illustrated in the accompanying drawings, in which—

Figure 1 is a side view of a bicycle, showing the application of the invention to the wheels thereof. Fig. 2 is a detail view in elevation of the pump and adjunctive parts. Fig. 3 is a section about on the line X X of Fig. 2. Fig. 4 is a section on the line Y Y of Fig. 2.

Corresponding and like parts are referred to in the following description and indicated in all the views of the drawings by the same reference characters.

Within the purview of the invention it is to be understood that the pump and coöperating parts are designed to be applied to a vehicle-wheel of any pattern or make whether used in connection with bicycles and kindred machines or with automobiles and road-vehicles of like character. Inasmuch as the invention will in all probability be used more generally in connection with bicycles and machines of this type it is by preference shown in this relation in the accompanying drawings.

The pump is secured to the main portion of the wheel and the actuating mechanism to the hub thereof, the latter consisting, essentially, of an eccentric 1 and a yoke 3. The eccentric 1 is preferably a disk and is loosely mounted upon the hub A of the wheel, collars 4 being applied to the hub upon opposite sides of the eccentric, so as to hold the latter in place. The inner collar may be loosely fitted to the end portion of the hub A and is interposed between the spokes and the eccentric 1, whereas the outer collar is secured to the outer end of the hub in any desired manner, as by means of set-screws B. The yoke 3 is formed of a metallic strap, preferably of steel, and is reinforced at its sides by rings C, secured thereto and spaced apart a sufficient distance to receive the peripheral portion of the eccentric 1, which operates freely in the space formed between them. The rings C, in addition to stiffening the yoke, provide lateral guides to prevent relative lateral displacement of the eccentric and yoke when assembled. The terminal portions of the strap comprising the yoke are offset or bent outward and are connected by means of a bolt or kindred fastening 5, which can be tightened to take up any play between the parts 1 and 3 and insure a snug fit without binding. The end portion of the strap is rebent, as shown at D, and is riveted or otherwise secured to the yoke a short distance from its offset end. The bracket 6, carrying the pump-cylinder, is attached at its outer end to the part D of the yoke, and this bracket is of such a shape as to clear the spokes of the wheel and allow for the oscillatory movements of the pump-cylinder when the inflating mechanism is in operation.

The air-pump or inflating means may be of any construction and comprises in its organization a pump-cylinder 8 and a piston E, the cylinder being attached to the bracket 6 and the outer end of the piston-rod 9 to the spokes by the means presently to be described. In order to admit of the detachment of the cylinder 8 from the bracket 6, the latter is provided at one end with a cuff or sleeve 7, constructed to clamp the cylinder 8. The piston-rod 9 is tubular and is connected with the air-valve 15 of the pneumatic tire F by means of a tube 14 in the well-known manner.

A clamp is secured to adjacent spokes of the wheel and comprises complementary bars 12, having their middle portions offset or oppositely deflected to receive the head 10, which is journaled in the space formed between them. The end portions of the companion bars 12 are secured by means of bolts or kindred fastenings 13, provided in pairs, the spokes supporting the clamp passing between the fastenings of each pair, as clearly illustrated. The head 10 is in the shape of a block and is provided at opposite sides with trunnions 11, which obtain bearings in the offset part of the bars 12, and this head is apertured for the passage of the piston-rod 9, the latter having collars 20 to engage with opposite ends of the head and prevent longitudinal movement of the piston-rod and yet admit of the latter turning when applying the connection 14 to the air-valve 15. By having the head 10 mounted in the manner set forth provision is had for the oscillatory movements of the pump-cylinder without any binding or straining of the parts.

When the air-pump is out of action, it and the actuating means rotate freely about the axle with the wheel; but when it is required to inflate the tire the eccentric is restrained from rotary movement and the yoke rotating about the same with the wheel imparts a reciprocating movement to the pump-cylinder, which causes an inflation of the tire in the well-known manner. The eccentric is adapted to be held in check or released by the rider or operator according to the nature of the machine or vehicle to which the mechanism is applied. A stop 21 is secured to the eccentric 1 and projects laterally therefrom and partakes of the nature of a forked bracket, one of the fork members being shorter than the other member, as shown at 22, whereby provision is had for the restraining means entering the crotch 23 of the fork, so as to prevent relative movement of the eccentric in either direction. It is not essential that the stop be constructed in the manner set forth; but it is preferred to have it formed in the manner stated, since the eccentric can be held against movement in either direction. The restraining means for securing the eccentric in its simplest form consists of a rod 24, slidingly mounted in suitably-disposed keepers, and this rod extends within convenient reach of the seat of the rider or operator, so as to be actuated when it is required to throw the inflating mechanism either into or out of action. The end of the rod 24 is provided with a grip for convenience of operation, and the end adjacent to the eccentric is adapted to be projected into the path of the stop 21, so as to prevent rotation of the eccentric when it is required to throw the air-pump into action. It is necessary to provide a restraining device for each wheel, and its particular construction will depend upon the location and style of machine or vehicle to which the invention is applied. In the case of bicycles the rod for throwing the pump applied to the front wheel into action will be applied to the front fork and steering-post and extends within convenient reach of the handle-bar, and the rear bar 24 will be applied to the rear fork or back stays, and its upper end will terminate so as to be readily accessible from the rider's seat.

The invention is of such construction as to be readily applied to any style of machine or road-vehicle without requiring any special construction of the wheel or hub and involves a simple, light, and effective construction, and is at all times under control, so as to be thrown into or out of action. When not in active service, the contrivance does not impede the progress of the machine or require the expenditure of extra propulsive force and when thrown into action is comparatively light-running. The pump can be thrown into or out of action without requiring the stopping of the machine or vehicle and without necessitating the dismounting of the rider or operator.

Having thus described the invention, what is claimed as new is—

1. In means for inflating pneumatic tires, an eccentric, a yoke fitted to the eccentric and having offset portions adjustably connected and side portions embracing opposite sides of the peripheral portion of the said eccentric, one of the offset portions being bent back upon itself and secured to the body of the yoke and a pump in coöperative relation with the said eccentric and yoke and adapted to be actuated thereby, substantially as and for the purpose set forth.

2. In a pneumatic-tired wheel and means for inflating the tire thereof, an eccentric and yoke in coöperative relation, a pump adapted to be actuated by means of the said eccentric and yoke, one of the parts being secured to the said yoke, a clamp secured to spokes of the wheel, and a head receiving the other part of the pump and journaled to the clamp so as to oscillate in unison with the oscillatory movements of the pump when the latter is in active operation, substantially as specified.

3. In a pneumatic-tired wheel and inflating means therefor, an eccentric and yoke in coöperative relation, a pump having one of its parts connected with the said yoke, a clamp comprising companion members having their intermediate portions oppositely deflected to form a space, and an oscillatory head located in said space and having trunnions mounted in the offset portions of the clamp members, said head having the other part of the aforementioned pump fitted thereto, substantially as set forth.

4. In means for inflating pneumatic tires, a pump, an eccentric and yoke disposed for coöperative relation in actuating the said pump, a stop projected from the said eccentric and comprising fork members of unequal length, and a restraining device adapted to clear the short fork member of the stop and to enter the crotch formed between the fork members by a longitudinal movement and lock the eccentric against movement in either direction, substantially as specified.

5. The herein-described means to be applied to a pneumatic-tired wheel for inflating the same, said means consisting of an eccentric, a yoke having offset terminals and side portions to embrace the sides of the peripheral portion of the eccentric, means for adjustably connecting the offset terminals of the yoke, a bracket secured to an end portion of the yoke, a cuff attached to the bracket, a pump having its cylinder held by the said cuff, a clamp comprising companion members having their middle portions oppositely deflected, a head located in the space formed by the offset portions of the clamp members and provided with trunnions mounted in the said offset portions of the clamp, said head receiving the piston-rod, collars applied to the piston-rod and embracing opposite ends of the oscillatory head, and means for preventing rotation of the eccentric when the pump is in operation, substantially as set forth.

In testimony whereof I affix my signature in presence of two witnesses.

JOHN ANDREW MILLS. [L. S.]

Witnesses:
H. E. ELDRIDGE,
P. W. GARDNER.